Feb. 7, 1939.  M. HEFFTNER  2,146,575
CLAMP
Filed May 18, 1937  3 Sheets-Sheet 1
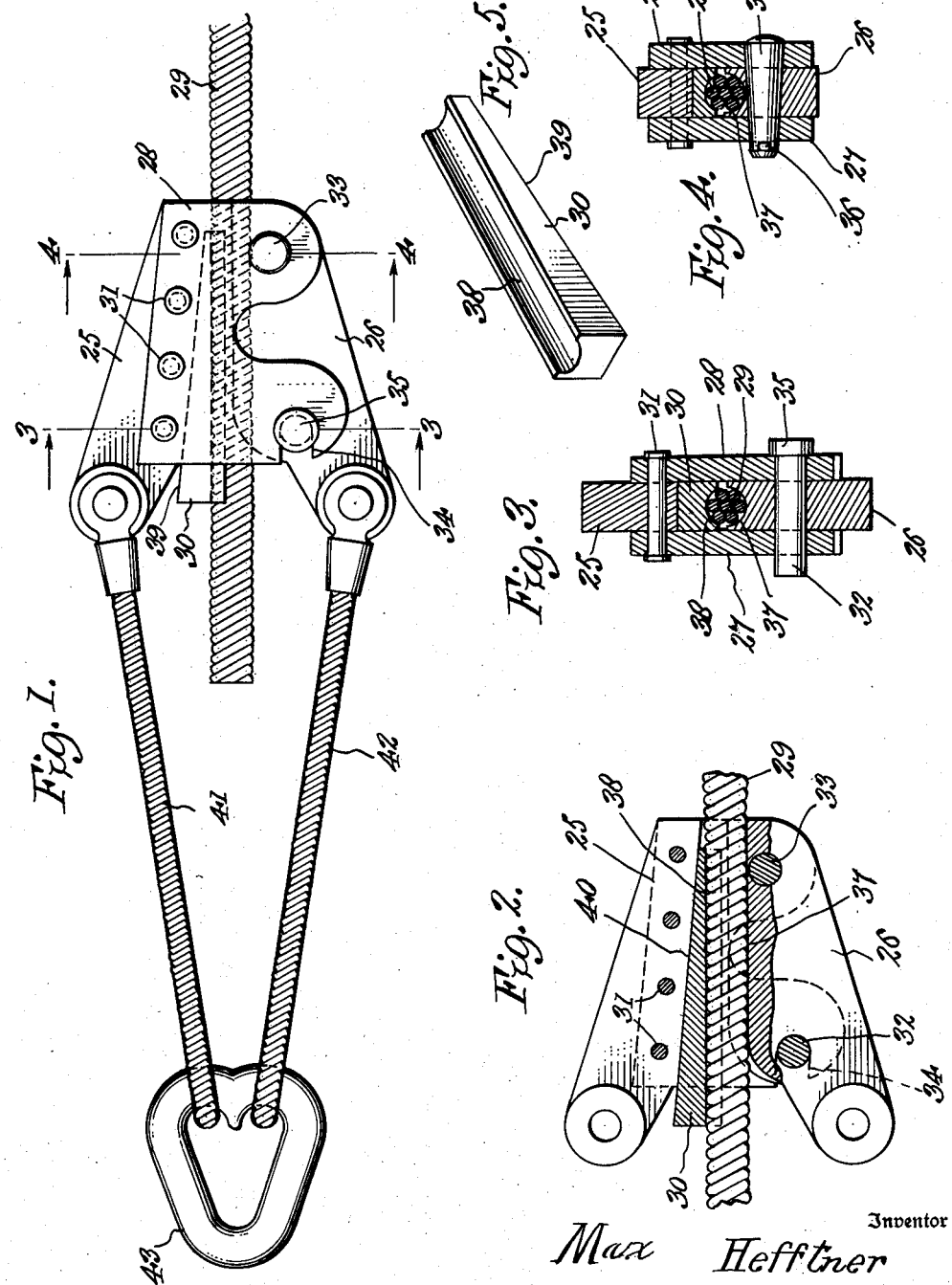
Inventor
Max Hefftner
By
C. P. Goepel
Attorney

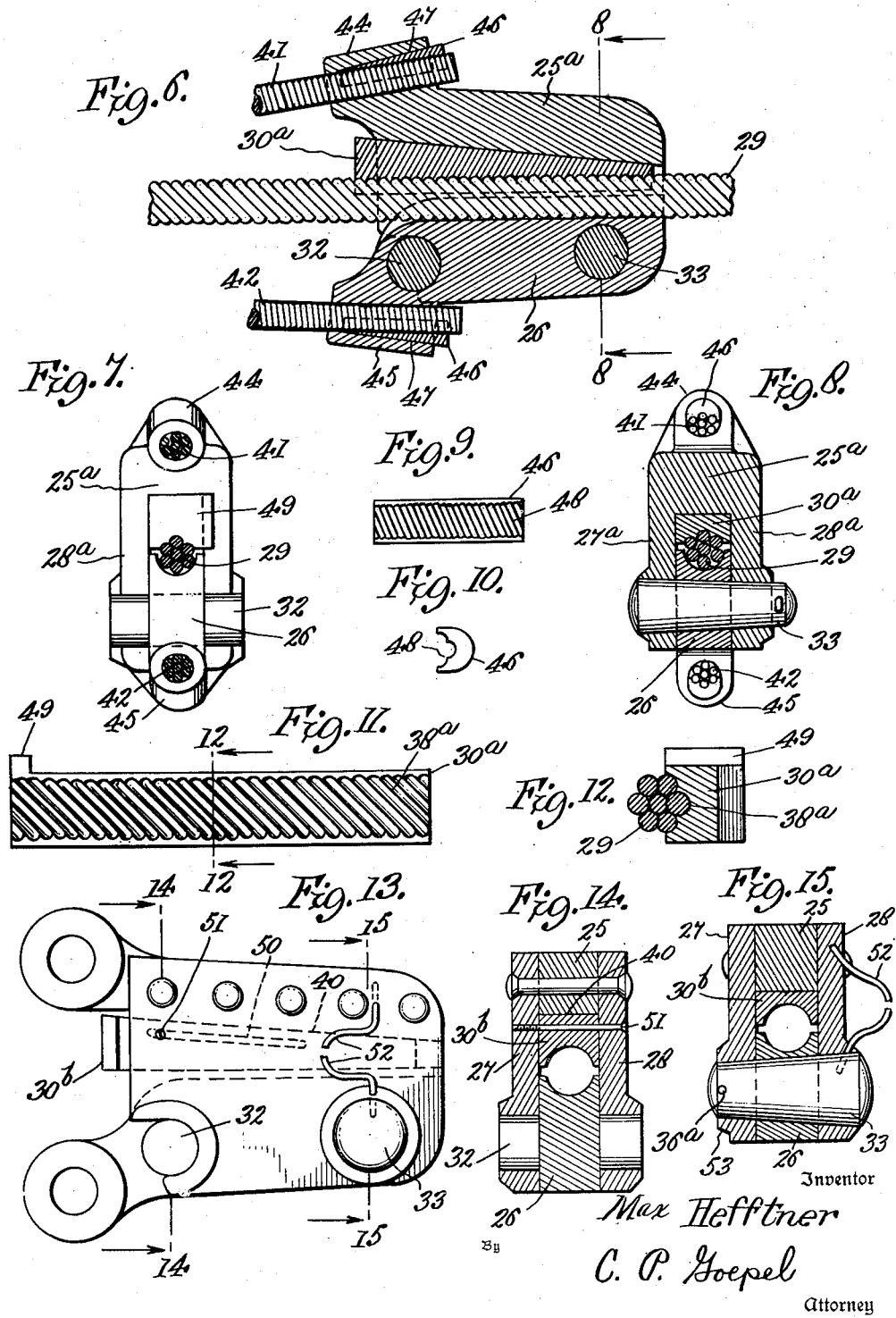

Feb. 7, 1939.   M. HEFFTNER   2,146,575
CLAMP
Filed May 18, 1937   3 Sheets-Sheet 3
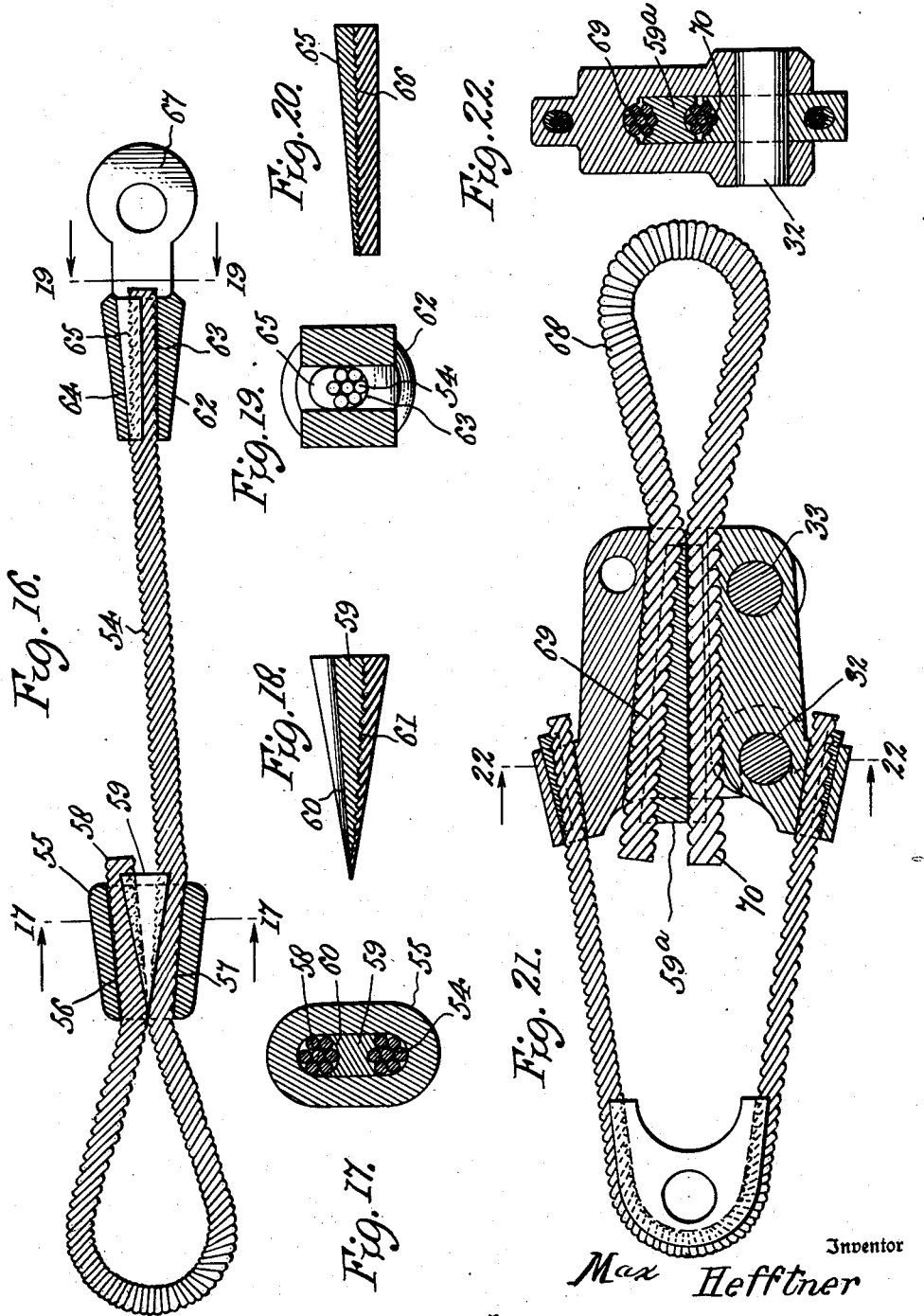
Inventor
Max Hefftner
C. P. Goepel
Attorney Patented Feb. 7, 1939

2,146,575

UNITED STATES PATENT OFFICE 2,146,575

CLAMP

Max Hefftner, Fort Wadsworth, N. Y.

Application May 18, 1937, Serial No. 143,360

9 Claims. (Cl. 24—136)

The present invention relates to improvements in clamps and has for an object to provide a cable or rope clamp in which a high degree of safety is promoted by the secure manner in which the clamp retains the rope or cable against relative movement or slippage therein.

Another object of the invention resides in providing an improved gripping clamp, in which the clamp structure permits of the easy introduction of the rope or cable and quick manipulation of the clamp to finally secure such cable therein.

A further object of the invention resides in providing an improved clamp having few and simple parts susceptible of manufacture in existing plants with present forms of machinery, and admitting of being assembled in a quick and easy manner, and adapted for use by uninformed laborers without the need of any special education.

With the foregoing and other objects in view the invention will be more fully described hereinafter and more particularly pointed out in the appended claims.

In the drawings, in which like parts are denoted by the same reference characters throughout the several views, Fig. 1 is a side elevation of an improved gripping clamp constructed in accordance with the present invention.

Fig. 2 is a similar view with parts broken away and parts shown in section.

Fig. 3 is a cross-section taken on the line 3—3 in Fig. 1.

Fig. 4 is a similar view taken on the line 4—4, also in Fig. 1.

Fig. 5 is a perspective view of the improved wedge member employed.

Fig. 6 is a longitudinal sectional view taken through a slightly modified form of the clamp.

Fig. 7 is an end view thereof.

Fig. 8 is a cross-section taken on the line 8—8 in Fig. 6.

Fig. 9 shows a plan view of the gripping face of one of the wedge elements.

Fig. 10 is an end view of the same.

Fig. 11 is a face view of the large wedge employed in Fig. 6.

Fig. 12 is a transverse section taken on the line 12—12 in Fig. 11.

Fig. 13 is a side elevation of a further modified form of the improved clamp.

Fig. 14 is a cross-section taken on the line 14—14 in Fig. 13.

Fig. 15 is a similar view taken on the line 15—15, also in Fig. 13.

Fig. 16 is a longitudinal sectional view taken through a pair of clamps involving further modifications and shown with cables engaged therein in a novel arrangement.

Fig. 17 is a cross-section taken on the line 17—17 in Fig. 16.

Fig. 18 shows a longitudinal sectional view through the duplex form of gripping wedge.

Fig. 19 is a transverse section taken on the line 19—19 in Fig. 16.

Fig. 20 is a longitudinal section taken through the single form of wedge.

Fig. 21 is a longitudinal section taken through a further modified form of gripping clamp, and Fig. 22 is a cross-section taken on the line 22—22 of Fig. 21.

Referring more particularly to the drawings and for the present to Figs. 1 to 5 inclusive, 25 and 26 designate two cooperating jaw members, and 27 and 28 represent side plates for connecting the jaw members 25 and 26 and also for laterally enclosing the space between such jaw members in order to properly confine the cable 29 and the wedge block 30 therein.

Rivets or other appropriate fastenings 31, in any suitable number, are preferably employed to secure the side plates 27 and 28 to the jaw member 25 with portions of the side plates 27 and 28 overlapping the inner portion of such jaw member 25. The side plates also partially overlap the companion jaw member 26 and are secured thereto preferably in a removable manner, for instance by the pins 32 and 33. The pin 32 is fixed at its intermediate portion in the jaw 26 and has end portions thereof projecting to opposite sides of said jaw member 26. These projecting shank portions are adapted to be detachably engaged by the slotted or notched parts 34 of the side plates. As shown in Fig. 1 these notches 34 open through the adjacent edges of the side plates in order that the projecting shank portions of the pin 32 may be slid into the notches 34 in the act of assembling the jaw member 26 upon the side plates 27 and 28. One or both of the projecting shank portions of the pin 32 may be headed as indicated at 35 in Fig. 3 in order to engage the outside face of the side plate to more intimately hold the side plates to the jaw member.

In Fig. 4 the other pin 33 is shown as being a removable tapered or wedge pin inserted through registering openings in the two side plates and in the overlapped portion of the jaw member 26. A cotter pin 36 or other removable key is insertable through the projecting narrower end of the taper pin 33 to hold the same removably in place. The tapering character of the pin 33 enables it to be inserted with facility through the aligning openings in one plate 28, and thence through the opening in the jaw member 26 and finally through the opening in the opposed side plate 27. The openings in these various parts may not be in precise registration when the pin 33 is initially inserted with its smaller end acting as a pilot engaging in the large opening of the plate 28 in which the widest diameter of the pin 33 finally fits in a snug manner.

Thus the taper pin 33 may be inserted through the openings when such openings are only roughly aligned. The taper pin will cause the openings to move into alignment and the parts into proper final position.

The jaw member 26 is formed with a jaw socket or face 37, while the upper jaw face 38 is provided upon the wedge block 30. The wedge block 30 tapers generally from one end to the other which results in the formation of an inclined plane 39 on the face thereof opposed to the jaw face 38. This inclined plane or wedge face 39 is adapted to fit against, and slide in contact with, a mating inclined plane face or wedge like wall 40 on the jaw member 25.

In the use of this form of the device, a bridle composed of the strands or ropes 41 and 42 is connected to the improved clamp. In Fig. 1 the bridle cable 41 is shown as being connected to a lug or eye in the jaw member 25; the other bridle cable 42 is coupled to a similar eye or lug in the jaw member or detachable arm 26.

The cable 29 is first inserted from the right hand side into the space between the jaw 25 and the arm 26. Thereafter the wedge block 30 is introduced between the cable and the inclined surface 40. If desired the wedge block 30 may be hammered into place, although the strain or pull of the cable 29 to the right will automatically cause the wedge block 30 to move along with it in that direction thus compressing the cable against the cable engaging surface 37 of the arm member 26. The cable engaging surface 37 may be made smooth if desired but it is preferably roughened or corrugated or indented to the pattern of the cable strands for the purpose of more effectively binding the cable in the clamp. The ring 43 of the bridle is suspended by a derrick, or pulled along by a tractor or other device, whereby the improved clamp is suspended or pulled along with such bridle. The cable 29 is consequently pulled along with the load attached thereto. The load imposing a strain on the cable 29 acting in a right hand direction, viewed in Figs. 1 and 2, acts to drive the wedge block 30 to the right and thus more forcibly bind the cable in the clamp commensurately with the weight sustained by the cable 29.

When the load and the cable 29 are to be released from the clamp, the cotter pin 36 is first removed and the taper pin 33 withdrawn. If this pin 33 is lodged tightly in place, one or more blows from a hammer will suffice to free it and allow of its withdrawal. As soon as the pin 33 is withdrawn the pressure of the clamp on the cable will be released. In fact, the arm 26 may then rotate slightly about the trunnions 32 as a center and the arm 26 may be entirely free to be pulled forwardly or in a left hand direction as viewed in Figs. 1 and 2 for the purpose of withdrawing the trunnions 32 from the notches 34; thereby entirely disconnecting the arm 26 from the shell of the clamp, this shell being composed of the jaw member 25 in combination with the side plates 27 and 28.

Referring more particularly to the form of device shown in Figs. 6 to 12 inclusive, this device is substantially the same as that heretofore described except that the bridle cables 41 and 42 are received through hollow lugs 44 and 45 and held therein by wedges 46. The wedges are tapering or have inclined outer walls cooperating with the inclined walls 47 of the lugs. One of these wedges 46 is illustrated in Figs. 9 and 10.

In Fig. 9 the wedge face 48 is impressed with indentations conforming to the external strand configuration of the bridle cable. Fig. 10 shows an end view of this wedge 46 to further emphasize the characteristics of the wedge face 48 whereby the strands on the outside of the bridle cable will lie closely within the indentation 48 in the face of the wedge member. The manner in which the cable strands occupy these indentations is indicated in Fig. 8. The strands extend spirally of the cable as do the indentations 48. Therefore the spiral strands occupying the spiral indentations 48 of the wedge block interpose forcible deterrent to the longitudinal slippage of the bridle cable. The effect of the strands of the cable occupying the indentations is to draw the wedge along with the cable causing such wedge to ride down the inclined surface 47 and to thus more securely bind the cable in the lug.

Figs. 11 and 12 show the large wedge block 30ª. The face 38ª is indented with an impression of the strands of the supporting cable 29 for the purpose of cooperating more effectively with this cable to cause the wedge 30ª to bind the cable in the clamp. The lug or flange 49 on the wedge block will be useful in receiving hammer blows and also in enabling a chisel or other instrument to get behind this flange or lug for the purpose of prying the wedge block outwardly from its binding engagement.

There is another difference in the form of invention shown in Figs. 6 to 12 inclusive over that shown in Figs. 1 to 5 inclusive, and that difference lies in the formation of the shell. In Figs. 7 and 8 particularly the side plates 27ª and 28ª are shown as made in one piece with the jaw member 25ª; or the side plates may be welded to the jaw member 25ª.

Referring more particularly to Figs. 13, 14 and 15, the wedge block 30ᵇ is shown as having a slot 50 therein extending lengthwise of the wedge for the purpose of receiving therethrough a dowel pin 51 which is inserted through the side plates 27 and 28. The slot 50 will be inclined downwardly from one end of the wedge to the other in substantial conformity with the inclination 40 of the wedge top wall. Instead of a slot, a groove may be provided along one side of block 30ᵇ and the dowel pin may be sharpened to engage the groove after passing through the plate 28.

In this form of the invention a captive cord 52 is shown as having one end affixed to the shell and the other end to the taper pin 33 whereby to prevent loss of the pin 33 when withdrawn.

In the plate 27 there may be formed a boss 53 through which the cotter key 36ª passes.

Referring more particularly to Figs. 16 to 20 inclusive, a cable 54 is shown as having one end reaved through a ring or sleeve 55 open at both ends and having inclined upper and lower walls 56 and 57. One of these walls, for instance the wall 57 is adapted to be engaged by an intermediate portion of the cable 54 while the end 58 of such cable lies in contact with the other inclined walls 56. These walls 56 and 57 converge in one direction to a width of substantially that of double the diameter of the cable whereby the sleeve at its smaller end accommodates both the cable 54 and its end portion 58. The inclined walls 56 and 57 diverge in the other direction so that the cable 54 and its end 58 are separated. Into this wedge shaped space is driven a wedge block 59. This block is shown more particularly in Fig. 18 and in cross-section in Fig. 17. The block, as illustrated, has a smooth cable engaging upper surface or wall 60 and an indented lower wall 61. Both walls 60 and 61 are preferably in-curved as shown in Fig. 17 in order to generally follow the cross-sectional curvature of the cable 54 and its end 58. The wall 60 may also be indented in any manner if desirable. The wall 61 may be plain or smooth if desired, or indented with any other configuration.

At the right hand end of Fig. 16, the opposite end of the cable 54 is shown as being fitted in a sleeve 62 having inclined walls 63 and 64. A wedge block 65 is driven between one of these inclined walls and the cable end. The wedge block 65 may be of the type shown in Fig. 20, the block being tapering and having an indented face 66. It will be understood that the face 66 may be plain or smooth or indented in accordance with a different pattern. The cable is connected with an eye or ring 67.

Referring more particularly to Figs. 21 and 22, a form of shell and its arm, already described are shown. In this case however a cable 68 is doubled and has both its ends 69 and 70 inserted into the space within the clamp. A wedge block 59a, similar to that shown in Fig. 18 is inserted between the two cable ends 69 and 70 and causes binding of such ends in the clamp. The clamp is released by withdrawing the taper pin as already described.

The improved gripping clamp can be attached very quickly and also can be released very quickly either with the strain on or off.

It is obvious that various changes and modifications may be made in the details of construction and design of the above specifically described embodiment of this invention without departing from the spirit thereof, such changes and modifications being restricted only by the scope of the following claims.

What is claimed is:

1. An improved clamp comprising a casing composed of a jaw member and side plates secured thereto and extending therebeyond, an arm removably fitting between the projecting portions of said side plates, said arm having portions projecting laterally therefrom, said side plates having notches open through one edge to detachably receive the projecting portions on said arm, removable interlocking means between said side plates and arm, and wedge means in slidable engagement with said jaw member.

2. An improved clamp comprising a jaw member, plates thereon projecting to one side of the jaw member, said plates having notches therein opening through one edge thereof, an arm having trunnions projecting laterally therefrom and detachably engaging said notches on a sliding movement of said arm, said arm and side plates having aligning openings therethrough, a locking pin detachably engaging through the aligning openings, said arm having a cable receiving part, and a wedge member slidable between the plates and against said jaw member and having a surface for fitting against the cable.

3. An improved clamp comprising a jaw member, plates attached thereto and extending beyond the jaw member, an arm removably received between the extending portions of said plates, said plates and jaw having at one end portion thereof notches and trunnions for engaging said notches on a sliding movement of said arm in the direction of cable pull, interlocking means between said side plates and arm spaced from said trunnions and notches, said arm having means to receive a cable, and wedge means opposed to the cable receiving surface of said arm and movably received between said side plates and against said jaw member.

4. An improved clamp comprising a jaw member having an inclined surface, side plates projecting from said jaw member, said side plates having notches at one end portion opening through the edge of said end portion, said side plates also having registering openings in the other end portion, an arm removably received between said side plates and having a cable receiving portion in spaced relation to the inclined surface of the jaw member, trunnions on said arm adapted to enter said notches of the plates by a sliding movement of the arm in the direction of cable pull, said arm also having an opening adapted to align with the registering openings of said plates, a taper pin removably insertable in the registering and aligning openings, means to retain said taper pin detachably in place, and a wedge block having an inclined surface slidable against the inclined surface of said jaw member and also having a cable receiving surface opposed to the cable receiving portion of said arm.

5. A clamp comprising a pair of jaw members, a pair of spaced apart plates fixed to one of said members and engaging on opposite sides of the other member, means engaging through said plates and said other member detachably securing said other member therebetween, said means including a notch in an edge of each plate and a pin carried by said other member engaging in said notch, and a wedge engageable between said plates and coacting with one of said jaw members to bind a member therebetween, said wedge having a cable receiving surface grooved to engage the strands of the cable so held.

6. A clamp comprising a pair of jaw members disposed in divergent relation, a pair of spaced apart plates fixed to one of said members and engaging on opposite sides of the other member, a tapered pin engaging through said plates and said other member adjacent an end thereof, a second pin carried by said other member and projecting laterally of opposite sides thereof, said second pin being disposed adjacent the opposite end of said other member, said plates having notches opening through the opposite ends thereof to receive said second pin, and a wedge engageable between said plates and coacting with one of said jaw members to bind a member therebetween.

7. A clamp comprising a pair of jaw members disposed in divergent relation, a pair of spaced apart plates fixed to one of said members and engaging on opposite sides of the other member, a tapered pin engaging through said plates and said other member adjacent an end thereof, a second pin fixedly carried by said other member and projecting laterally of opposite sides thereof, said second pin being disposed adjacent the opposite end of said other member, said plates having notches opening through the opposite ends thereof to receive said second pin, and a wedge engageable between said plates and coacting with one of said jaw members to bind a member therebetween.

8. A clamp comprising a pair of jaw members, a pair of spaced apart plates fixed to one of said members and engaging on opposite sides of the other member, means engaging through said plates and said other member detachably securing said other member therebetween, said means including notches in an edge of said plates and a pin fixedly carried by said other member engaging in said notches, and a serrated wedge engageable between said plates and coacting with one of said jaw members to bind a member therebetween.

9. A clamp comprising a pair of jaw members, a pair of spaced apart plates fixed to one of said members and adapted to engage on opposite sides of the other member, means engaging through said plates and one end of said other member detachably securing the other member to the plates at said one end, and a pin and notch connection for detachably securing the other end of said other member to said plates, said pin and notch connection being detachable by longitudinal sliding of the said other member relative to said plates when the said means is detached to free the said one end from said plates.

MAX HEFFTNER.